(12) United States Patent
Rowberry

(10) Patent No.: US 8,991,693 B2
(45) Date of Patent: Mar. 31, 2015

(54) CONFIGURATION OF ISSUED DYNAMIC DEVICE

(75) Inventor: Donald Rowberry, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 436 days.

(21) Appl. No.: 12/977,989

(22) Filed: Dec. 23, 2010

(65) Prior Publication Data

US 2011/0155801 A1 Jun. 30, 2011

Related U.S. Application Data

(60) Provisional application No. 61/291,193, filed on Dec. 30, 2009.

(51) Int. Cl.
| | |
|---|---|
| *G06Q 40/00* | (2012.01) |
| *G07D 11/00* | (2006.01) |
| *G06K 19/00* | (2006.01) |
| *G07F 7/08* | (2006.01) |

(Continued)

(52) U.S. Cl.
CPC ............ *G07F 7/0866* (2013.01); *G06Q 20/341* (2013.01); *G06Q 20/3572* (2013.01); *G07C 9/00* (2013.01)
USPC .......................................... 235/379; 235/487

(58) Field of Classification Search
CPC ....... G06Q 20/32; G06Q 20/20; G06Q 20/40; G06Q 20/204; G06Q 30/02; G06Q 20/325; G06Q 30/0238; G06Q 20/327; G06Q 20/3278; G06Q 20/341; G06Q 20/387; G06Q 20/363; G06Q 20/351; G06Q 20/353; G06Q 20/3572; G06Q 20/322; G06Q 20/3226; G06Q 30/0601; G06Q 20/347; G06Q 40/12; G06Q 20/3552; G06Q 20/36; G06Q 20/202; G06Q 20/3229; G06Q 20/3563; G06Q 20/3672; G06Q 20/3674; H04M 15/00; H04M 15/68; H04M 17/00; G06K 19/0723; G06K 19/06187; G06K 19/0718; G06K 19/07707; G06K 19/06206; G06K 7/082; G06K 7/083; G07F 7/0886; G07F 7/1008
USPC ........................... 235/380, 375, 385; 455/406
See application file for complete search history.

(56) References Cited

U.S. PATENT DOCUMENTS

| | | | |
|---|---|---|---|
| 4,837,422 A | * | 6/1989 | Dethloff et al. ............... 235/380 |
| 5,530,232 A | | 6/1996 | Taylor |

(Continued)

FOREIGN PATENT DOCUMENTS

| | | |
|---|---|---|
| KR | 10-2004-0025318 A | 3/2004 |
| KR | 10-2008-0085933 A | 9/2008 |

OTHER PUBLICATIONS

International Search Report from Application No. PCT/US2010/061857, dated Jul. 28, 2011, 5 pages.

(Continued)

*Primary Examiner* — Thien T Mai
(74) *Attorney, Agent, or Firm* — Kilpatrick Townsend & Stockton LLP

(57) ABSTRACT

Embodiments of the invention may include a method, system, and apparatus that receives payment data that is associated with an issued payment device. Once the payment data is received, the method can then enable payment capabilities on a dynamic device. Such payment capabilities enabled on the dynamic device may be based on the payment data that is associated with the issued payment device.

21 Claims, 10 Drawing Sheets

(51) Int. Cl.
  *G06Q 20/34* (2012.01)
  *G07C 9/00* (2006.01)

(56) References Cited

U.S. PATENT DOCUMENTS

| | | | |
|---|---|---|---|
| 6,715,679 B1 | 4/2004 | Infosino | |
| 2001/0013551 A1 | 8/2001 | Ramachandran | |
| 2002/0038287 A1 | 3/2002 | Villaret et al. | |
| 2003/0083042 A1* | 5/2003 | Abuhamdeh | 455/406 |
| 2003/0149662 A1 | 8/2003 | Shore | |
| 2003/0155416 A1 | 8/2003 | Macklin et al. | |
| 2005/0236480 A1* | 10/2005 | Vrotsos et al. | 235/439 |
| 2006/0016879 A1* | 1/2006 | Kean | 235/380 |
| 2007/0131759 A1* | 6/2007 | Cox et al. | 235/380 |
| 2007/0239602 A1* | 10/2007 | Goodman et al. | 705/41 |

OTHER PUBLICATIONS

International Written Opinion from Application No. PCT/US2010/061857, dated Jul. 28, 2011, 5 pages.

* cited by examiner

CONFIGURATION OF ISSUED DYNAMIC DEVICE

CROSS-REFERENCES TO RELATED APPLICATIONS

This application claims priority from U.S. Provisional Appl. No. 61/291,193, filed Dec. 30, 2009, all of which is incorporated herein by reference in its entirety for all purposes.

BACKGROUND

Businesses often use security systems to limit access to facilities, networks, or any other resource. Such security systems can interact with access devices such as security badges to exchange identification information that determine security access rights. It is now common for access devices to be embedded with contactless smart chips to provide communication and functionality between the access device and the security system through an access device reader. Typically, the access device and the data stored therein are provided by an employer, a security company, or any other entity that manages the access to a resource.

Once a consumer or employee enters a secure site, as may be protected by a security system described above, the employer may offer items and service for sale. A consumer may make purchases using a payment device (e.g., a credit card). To illustrate, the consumer may visit the cafeteria or vending machine within the employer site to purchase their lunch using a credit card. Typically, the payment device and the data stored therein are provided by an issuer, financial institute, or a payment processing network.

Accordingly, the consumer must carry two separate devices, an access device to make requests to access a resource and a payment device to make payments. Further, with the trend of embedding processors in payment devices (e.g., smart cards), the security procedures adopted by the employer may prohibit such devices from entering specified work areas. Thus, under certain situations, employees may be prevented from bringing certain types of payment devices into the facilities of their employer and, as a result, the employee will then pay for goods with cash, which may represent an inconvenience to the consumer.

Embodiments of the present invention address these and other problems, individually and collectively.

BRIEF SUMMARY

Embodiments of the present invention include a system, apparatus, and method for configuring a dynamic device with payment data associated with a previously issued payment device using a configuration device. Specifically, the dynamic device (e.g., a security badge) may include pre-configured data to perform pre-existing functionality (e.g., granting access to a venue). Using an issued payment device, the dynamic device may be configured to store payment data associated with the issued payment device. This configuration enables the dynamic device to function as both a payment device and a device that performs the pre-existing functionality (e.g., granting access to a venue). In one embodiment, configuration of the dynamic device is achieved by use of a management module that permits payment data to be dynamically stored on a memory apparatus embedded within or otherwise connected to the dynamic device. A configuration device, in some embodiments, may be used to configure the dynamic device with the payment data associated with the issued payment device.

One embodiment includes a method of configuring a dynamic device using a payment device that is already issued by an issuer or payment processing network. Configuring the dynamic device includes receiving payment data associated with an issued payment device. Payment capabilities for the dynamic device are then enabled. Such payment capabilities may be based on the payment data associated with the issued portable consumer device.

Another embodiment includes a system for configuring a dynamic device using a payment device that is already issued by an issuer or payment processing network. Configuring the dynamic device includes a configuration device that receives payment data associated with an issued payment device. The configuration device then enables payment capabilities for the dynamic device. Such payment capabilities may be based on the payment data associated with the issued portable consumer device.

Other objects and advantages of the present invention will be apparent to one of ordinary skill in the art upon review of the detailed description of the present invention and the included figures.

DETAILED DESCRIPTION

Figure 1:
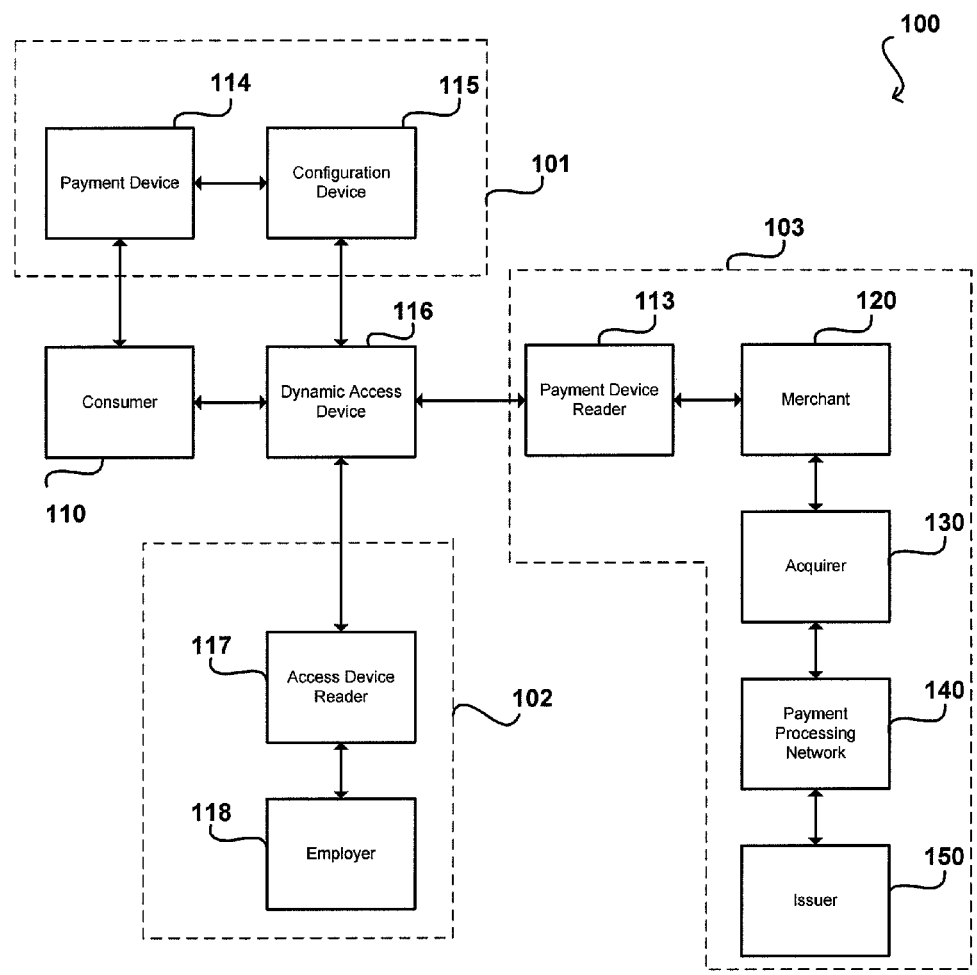
FIG. 1 is a block diagram illustrating the primary functional elements of a system for configuring a dynamic device, conducting a payment transaction with the dynamic device, and conducting an access transaction using the dynamic device, in accordance with some embodiments of the present invention.

Embodiments of the present invention include a system, apparatus, and method for using an issued payment device to configure a dynamic access device with the capability to make a purchase of a good or service which may be offered for sale by a merchant. More specifically, embodiments of the invention can enable a single device to provide payment functions associated with an existing device in addition to the functions that the single device was originally issued to perform.

Embodiments of the invention use a memory apparatus embedded within or otherwise included on a dynamic device to allow a user to configure the dynamic device with payment data associated with an issued payment device. Upon configuring the dynamic device with payment data, embodiments enable a user to purchase goods or services with the same device that is used to perform the functionality the dynamic device was originally programmed to perform (e.g., such as gaining access to facilities and venues) without the need to physically keep two different devices on hand.

In some embodiments, the memory apparatus may utilize a configurable memory storage element. In such a storage element, the memory in the memory apparatus may be partitioned to include a section for storage of payment data, and a section partitioned for issued data. The issued data may be stored on the dynamic device at the time the dynamic device is issued to the holder of the dynamic device. The payment data may be originally stored on a payment device at the time the payment device is issued to the holder of the payment device. Once an employee or consumer receives the dynamic device, the dynamic device may be configured to store the payment data stored on the issued payment device. In this way, the data storage section of the memory device, though limited, may be used to store data to perform multiple functions through updating or overwriting the data as required for the desired functionalities associated with the existing payment device.

Embodiments of the present invention are distinguished from other dual-use payment cards presently found in the prior art. For example, the functionality stored in the dual-use payment cards found in the prior art are pre-configured by the issuer of the payment card. In comparison, embodiments of the present invention uses a previously issued payment device to dynamically configured a previously issued dynamic device. For example, an issued security card can be configured with payment data associated with an issued credit card.

Embodiments of the present invention have a number of advantages. The holder of a dynamic device can decide which of their payment devices they want to use to configure their dynamic device. Because the configuration is dynamic, a separate multi-use card is not re-issued, according to some embodiments. Wherein the dynamic device offers contactless interface and the payment device does not, the holder of the dynamic device can enjoy the speed and convenience of the contactless transaction. In the case employer issued dynamic devices, the employer could subsequently configure the dynamic devices of its employees and contractors, which would allow the workplace to go cashless more quickly.

Further, the dynamic device provides other conveniences and control for the dynamic device holder. Consider embodiments of the invention where the dynamic device is an access card embedded with a smart card chip. In such a situation, the holder may consolidate the functionality provided by multiple devices into a single device. Further, obtaining a dual-use device is comparatively convenient in that the consumer can simply to visit the security department of their employer rather than the time consuming process of requesting a payment card issuer to re-issue a separate dual-use device.

Still further, the dynamic device may be a trusted device for some entities. For example, the security procedures adopted by an employer may prohibit devices capable of data communication and storage. As such, these procedures may prohibit certain types of payment device now or in the future. A credit card embedded with a smart chip and antenna is an example of such a payment device that may be prohibited. Consequently, employees with such prohibited payment devices may then resort to cash payments. Paying with cash is inconvenient and time consuming. However, the dynamic device may be issued by the security system or a trusted party. As such, the security procedures adopted by the employer may trust the dynamic device, thereby allowing the employee an option to pay with the dynamic device configured with payment data stored on the prohibited payment device.

The embodiments of the present invention can include, among other things, facilities for overcoming certain disadvantages of allowing entities other than the issuer of the payment device to configure a dynamic device with payment data associated with the issued payment device. For example, allowing consumers to configure the dynamic device with payment data associated with a payment device can result in unfettered transfer of payment data. Such transfers represent a risk to issuers and providers of a payment processing network because such transfers spreads sensitive data not only to additional devices but also to devices not under the control of the issuing institution. Such spread increases the likelihood that sensitive information may be compromised. Ensuring that the sensitive information is secure is desirable because issuers and payment processing networks may be liable for fraudulent purchases. As such, unfettered transfer of payment data to other devices can increase the risk for payment processing networks and/or issuers.

To overcome some of the above-mentioned problems which arise from the configuration of a dynamic device with payment data associated with a payment device, embodiments may provide protection to the sensitive information according to various methods. To begin, embodiments may utilize a configuration device that is under the control of a trusted entity. Additionally, embodiments may limit the spread of sensitive data. For example, embodiments may limit the number of dynamic devices that can store payment data. In another way, embodiments may disable a payment device which is used to transfer payment data. "Disabling" a device, as used herein, may refer to any indication that prohibits the device from being used as a payment device (or to configure additional dynamic devices). Other such methods are also possible, which are described below.

Before further discussion, it should be recognized that embodiments of the present invention may utilize any dynamic device capable of being configured with payment data associated with an issued payment device. An example of a dynamic device is an access device such as a security badge. Although described in greater detail below, a "dynamic access device," as used herein, can refer to any device capable of performing access transactions. It should be appreciated that although embodiments of the present invention described below reference dynamic access devices, other dynamic devices can also be used by other embodiments. For example, a loyalty card capable of being configured to store payment data associated with an issued payment device can be utilized. Still further, a payment device capable (described in greater detail below) capable of being configured to store payment data associated with an issued payment device can also be utilized according to other example embodiments.

As used herein, "access transaction," and similar terms, can include any transaction that determines whether to grant a device holder access to a particular venue. Examples of venues that may utilize access transactions include resources secured by a security system such as networks, vehicles, structures, buildings, facilities, equipment, or any other resource. In a typical situation, access transactions are performed by a security system that compares identification data included in a request for access to an access control list. According to some embodiments, an access transaction is initiated from communication exchanged between a dynamic access device and an access device reader connected to a system that secures the resource.

Different from an access transaction, "payment transaction," and similar terms used herein, can refer to any transaction that authorizes the purchase of a good or service. In a typical situation, payment transactions are performed by electronic payment systems that receive payment data stored in a payment device, wherein the payment data is to authorize a purchase by a consumer. As used herein, "payment data" can refer to any information transmitted to an electronic payment system to authorize the purchase a good or service. Examples of "payment data" include access control data (keys, passwords, etc), bank account information, bank identification number (BIN), expiration date, card verification value (CVV), credit or debit card number information, account balance information, etc.

As used herein, "payment capability" can refer to the ability to perform or otherwise participate in a payment transaction. For example, payment capabilities may include providing payment data to a payment system.

As used herein, a "memory apparatus" can refer to any storage device that provides an interface for reading in and/or writing out payment data. A magnetic stripe element and processor chips connected to computer readable medium (e.g., CMOS or DRAM memory, nonvolatile memory such as ROM, PROM, EEPROM, or flash memory, or combinations thereof) are examples of memory apparatuses.

I. System

Prior to further discussing the use of a particular type of dynamic device, a dynamic access device, that is capable of conducting both payment transactions and access transactions, a brief description of a typical electronic payment and access systems will be presented. FIG. 1 is a block diagram illustrating, in accordance with some embodiments of the present invention, the primary functional elements of system 100. In particular, a consumer 110 uses a dynamic access device 116 for: (1) configuring the dynamic access device 116 (sub-system 101), (2) conducting payment transactions with the dynamic access device 116 (sub-system 102), and (3) conducting an access transaction with the dynamic access device 116 (sub-system 103). Before describing these elements, it should be noted that for simplicity of illustration, FIG. 1 shows a number of functional elements for each component therein. For example, only one consumer is shown in FIG. 1. It should be understood, however, that example embodiments may include additional or fewer than all of the functional elements shown in FIG. 1. Also, the elements in FIG. 1 may communicate via any suitable communication medium (including the Internet), using any suitable communication protocol.

a. System Elements for Configuring the Dynamic Access Device

Sub-system 101 includes the consumer 110 using the dynamic access device 116 and a payment device 114 with a configuration device 115.

The consumer 110 may be an individual, or an organization such as a business that is capable of purchasing goods or services. The consumer 110 may use a payment device 114 that is received from an issuer 150 (described below) with the configuration device 115. The consumer 110 may also use a dynamic access device 116 that is received from an employer 118 or any other entity that limits access to a venue with the configuration device 115.

Payment device 114 and dynamic access device 116 may be in any suitable form. For example, devices 114 and 116 can be hand-held and compact so that they can fit into a consumer's wallet and/or pocket (e.g., pocket-sized). In example embodiments the devices 114 or 116 can have a contact or contactless smart card. Other examples of devices include cellular and mobile phones, personal digital assistants (PDAs), pagers, smart media, transponders, and the like.

The payment device 114 is a device that provides information that is used to conduct payment transactions. Examples of devices that provide such capabilities include debit devices (e.g., a debit card), credit devices (e.g., a credit card), or stored value devices (e.g., a stored value card). As is explained below, the payment device 114 includes payment data that is pre-configured by an issuing financial institution. Payment data can include financial information, such as bank account information, bank identification number (BIN), expiration date, card verification value (CVV), credit or debit card number information, account balance information, consumer information, etc.

The dynamic access device 116 can be any device that provides information that is used to conduct an access transaction. In some embodiments, access transactions can be performed according to the access rights assigned to an individual, group, business, or any other entity. Examples of devices that provides such capabilities include security cards, access cards, identification cards, etc. Typically, the access rights determine whether a security system will grant the consumer 110 entrance into a venue (e.g., a building, facility, property, etc). However, access rights can be associated with other rights, such as a right to conduct an activity, such as a drivers license or a permit to carry a gun or sell items. In example embodiments, an employer 118, a party under the direction of the employer 118 (e.g., security firm), a government, or any other entity assigns the dynamic access device 116 to the consumer 110. Such entities also pre-configure and manage the transaction data stored on the dynamic access device, according to some embodiments.

Configuration device 115 is an apparatus that reads in payment data stored on the payment device and then downloads a payment data onto the dynamic access device. The configuration device 115 may include a computer that executes software that performs a method of moving payment data from the payment device to dynamic access device. According to some embodiments, the configuration device 115 is operated by or otherwise under the control of the employer 118. Further, although not shown in FIG. 1, the configuration device 115 may be operatively connected to a payment processing network 140. The configuration device 115 includes device interfaces to read in payment data from the payment device 114 and to write out the payment data to the dynamic access device 116. The components of the configuration device 115 are described in greater detail below.

To configure the dynamic access device, the consumer 110 typically goes to a department that issued the dynamic access card (e.g., the badging office, the security department, etc.) and request the dynamic access device to be configured with payment data that is currently stored on the payment device 114 (e.g., as may be encoded on tracks I and/or II of a magnetic stripe for an existing credit, debit or prepaid card). The internal department at the employer may be a secure environment and, as part of standard operational procedures, the consumer 110 may be asked to show employee identification, driver license, or other identifying information. In other example embodiments, identification information can be provided to the configuration device 115 via the dynamic access device 116, then the configuration device 115 can then authorize access to the consumer 110. The payment device 114 can then be swiped or connected to the configuration device 115 which causes the payment data stored on payment device 114 to be transmitted to the configuration device 115.

Next the dynamic access device 116 is communicatively coupled to the configuration device 115. For example, the dynamic access device 116 can be passed near a contactless reader of the configuration device 115. The configuration device 115 then writes payment data to the dynamic access device 116. According to some embodiments, the configuration device may alter the payment data before installing the payment application onto the dynamic access device 116. For example, the configuration device may change some fields of the payment data, such as service codes to indicate that the device is now on a contactless payment device. Alternatively, the configuration device may process the payment data to form a payment application, as described below.

In example embodiments, configuration device may perform a number of operations to verify that the configuration was successful and secure. For example, the configuration device 115 could ensure that any sensitive payment data, such as cardholder information or account numbers, are removed or otherwise erased from memory of the configuration device 115. In other embodiments, the configuration device 115 may support operations that read in the payment data from the dynamic access device 116 to verify that the dynamic access device 116 is properly configured for payment capabilities.

Once configured with the payment data of the existing payment device 114, the dynamic access device can support dual-use that permits the consumer to have a single device with which to carry out building access transactions and also payment system transactions in accordance with the present invention. The consumer 110 can now use the dynamic access device 116 to make payments at the employer such as at a cafeteria or vending machines on campus. Instead of having to go to a bank in a secure facility, the consumer is able to just go to their employer as a trusted party to add contactless payment capabilities to his employee access card.

b. System Elements for Conducting Payment Transactions with the Dynamic Access Device On the payment side, sub-system 103 includes a payment device reader 113, merchant 120, an acquirer 130 associated with the merchant 120, the payment processing network 140, and issuer 150. As is further explained below, in a typical payment transaction, a consumer 110 may purchase goods or services from the merchant 120 using a dynamic access device 116. The dynamic access device 116 may store payment data, which may have been previously transferred from the payment device 114 to the dynamic access device 116 via a configuration device 115. The acquirer 130 can communicate with an issuer 150 via a payment processing network 140. Consumer 110 may be an individual, or an organization such as a business that is capable of purchasing goods or services.

The issuer 150 may be a bank, but it could also be business entity such as a retail store. The issuer 150 may operate a server computer (not shown), which may have a computer readable medium comprising code for performing the functions that the issuer 150 performs. The issuer may maintain a database comprising account number information and other information may be operatively coupled to the server computer. The issuer 150 may associate the consumer 110 and the payment device 114 to an account number. Before the consumer 110 configures the dynamic access device 116, the issuer 150 may provide the consumer 110 with the payment device 114 that includes payment data stored therein to link the payment device to a financial account associated with the account number. When an issuer provides a payment device to a consumer, such a device may be referred to as an "issued payment device."

Payment processing network 140 may include data processing subsystems and networks that implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for the transactions.

Payment processing network 140 may include a server computer. A server computer is typically a powerful computer or cluster of computers. For example, the server computer can be a large mainframe, a minicomputer cluster, or a group of servers functioning as a unit. In one example embodiment, the server computer may be a database server coupled to a Web server. Payment processing network 140 may use any suitable wired or wireless network, including the Internet, to facilitate communications and data transfer between the system elements depicted in the figure.

Merchant 120 may receive communications or data from a payment device reader 113 that can interact with dynamic access device 116. Examples of suitable payment device readers include point of sale (POS) devices or terminals, device readers for contact or contactless payment devices, cellular phones, PDAs, personal computers (PCs), tablet PCs, handheld specialized readers, set-top boxes, electronic cash registers (ECRB), automated teller machines (ATMs), virtual cash registers (VCRs), kiosks, and the like.

If payment device reader 113 is a point of sale terminal, any suitable point of sale terminal may be used including card readers or other forms of payment device readers. Such card or payment device readers may include the capability to operate in any suitable contact or contactless mode of operation. For example, exemplary card readers or devices can include RF (radio frequency) antennas, NFC (near field communications) capable devices, magnetic stripe readers, etc. to enable interaction with payment device 115.

c. System Elements for Conducting an Access Transaction with the Dynamic Access Device The dynamic access device 116 can also be used to conduct access transactions. This is shown with sub-system 102. Access is usually granted through an access device reader 117 installed, typically, at the an entry point to the venue or facility, such as, for example, a gate, door, or farebox. An access device reader 117 can be an electronic device that reads or communicates with a dynamic access device. An access device reader 117 may communicate with a dynamic access device by reading a barcode or magnetic strip or by communicating with a computer or other facility on the dynamic access device. In some embodiments, the dynamic access device communicates with the access device reader with a short range communication method, such as a near field communications capability. Examples of such near field communications technologies include ISO standard 14443, radio frequency identification (RFID), Bluetooth®, infra-red communications, or any other similar standard or proprietary method. The access specific data is stored in a dedicated storage region of the dynamic access device.

II. Devices

Prior to further discussing methods for configuring a dynamic access device to be capable of conducting both payment transactions and access transactions, a brief description of example embodiments of the access device, payment device, and configuration device will be presented. As described herein, components of these devices may be illustrated with "modules." As described herein, "modules" may constitute either software modules (e.g., code embodied on a machine-readable medium) or hardware modules (e.g., electrical or mechanical circuitry or logic). Whether software or hardware based, modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices.

a. Dynamic Access Device i. Structural Elements of the Dynamic Access Device

Figure 2A:
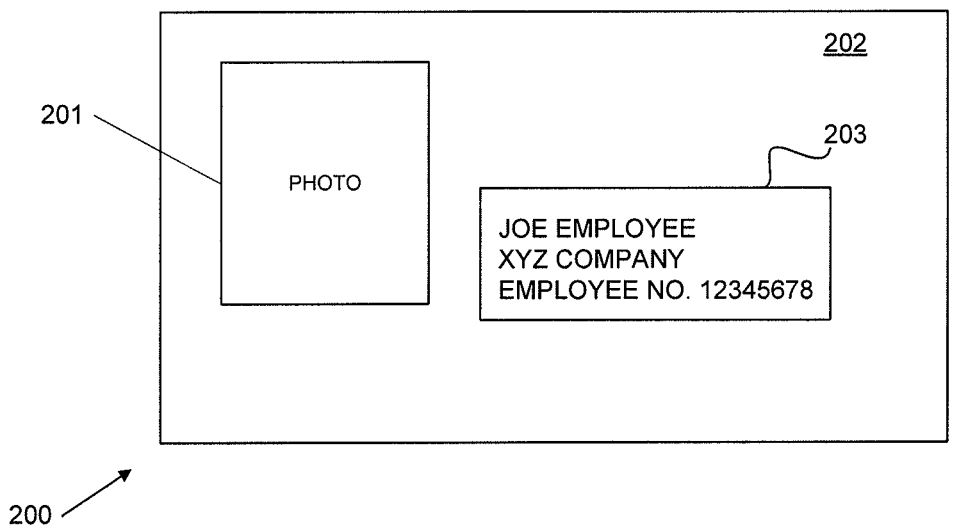
FIGS. 2A-C are diagrams illustrating the primary elements of a dynamic device, in accordance with some embodiments of the present invention.
Figure 2B:
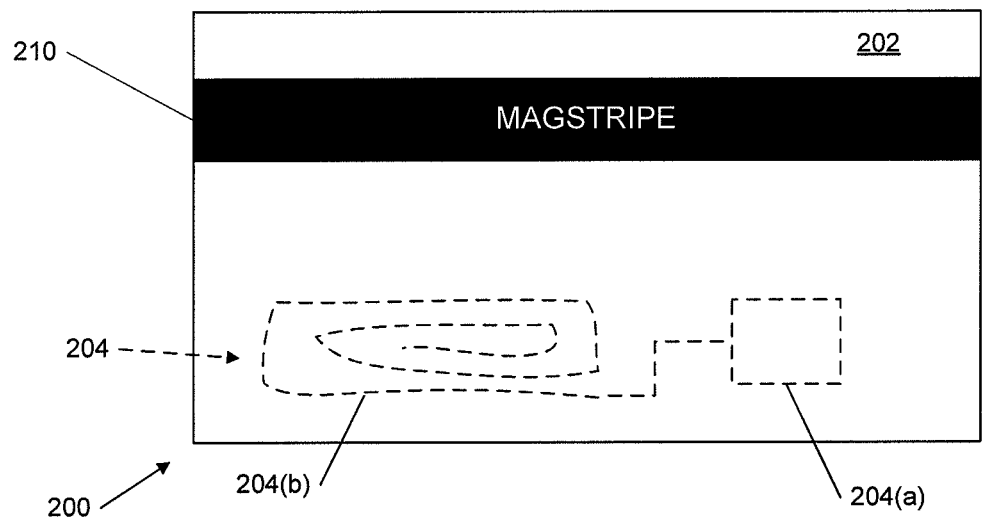
Figure 2C:
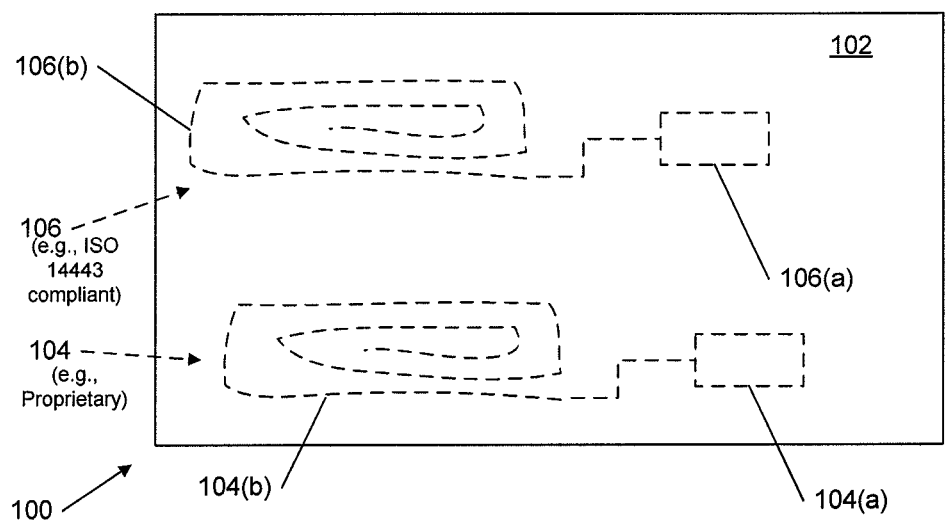

FIGS. 2A-2C illustrate exemplary implementations of a dynamic access device. Although the dynamic access device is shown to be in the form of a card, it should be appreciated that the dynamic access device can take any other suitable form. For example, suitable dynamic access devices can be hand-held and compact so that they can fit into a consumer's wallet and/or pocket (e.g., pocket-sized). In an example embodiment, the dynamic access device is a contactless smart card. Other examples of dynamic access devices include security cards or badges, cellular and mobile phones, personal digital assistants (PDAs), pagers, smart media, transponders, tokens, fobs, identification devices, and the like.

FIG. 2A is a diagram that illustrates a frontal face of a dynamic access device 200, according to an example embodiment. As shown in FIG. 2A, the dynamic access device 200 includes a substrate 202 that can provide identification, such as a photo 201 and employee information 203 (e.g., name, company, and employee number).

FIG. 2B is a diagram that illustrates a rear face of the dynamic access device 200 and elements internal to the dynamic access device 200, as indicated by dotted lines. The dynamic access device 200 may include a memory apparatus 204. The memory apparatus 204 can include a processor chip 204(a), having logic circuitry with memory, and an antenna element 204(b) for communication with an access device reader. The processor chip 204(a) may comprise a microprocessor chip, a microcontroller chip, a smart card chip, or any other suitable processor. The processor chip 204(a) is communicatively coupled to memory through a signal bus. The memory may comprise volatile memory such as CMOS or DRAM memory, nonvolatile memory such as ROM, PROM, EEPROM, or flash memory, or combinations thereof, and such memory can be located in the same chip bearing substrate 202 as the processor chip 204(a). Data stored in the memory may include applications executable by processor chip 204(a). Such applications may include, but are not limited to: a platform for securely loading payment applications associated with payment capabilities of an existing payment device, applications for granting access to a venue; and applications associated with payment capabilities of an existing payment device, including purchase data, rewards program information, or any other service.

The antenna element 204(b) may transmit information to and receive information from an external source, such as an access or payment device reader. As is explained below, the antenna element 204(b) is a specific type of a data interface and may be in any suitable form including a coil and may be embedded within the substrate 202. In some embodiments, the dynamic access device 200 may be powered by a passive circuit that is energized by the external source. For example, upon the antenna element 204(b) receiving a frequency from the external source, the processor chip 204(a) becomes active and allows access to instructions in memory for the execution of an application.

The dynamic access device may also communicate to the receiving device (e.g., configuration device, access device reader, payment device reader, etc) through direct contact. In such embodiments, this includes, but is not limited to, the receiving device having the capability to communicate electronically with the processor chip 204(a) via a contact plate (not shown). Alternatively, the receiving device may communicate by physical contact with a magnetic stripe assembly 210 bearing magnetically encoded data (shown on the rear face 200B of the payment device). The magnetic stripe assembly 210 may comprise, in one implementation, a reprogrammable magnetic stripe that accepts data and/or commands from processor chip 204(a) or an external source and formats and renders that data into a form on a magnetic stripe that is readable by conventional magnetic stripe-reading Point-Of-Service ("POS") terminals.

As described above, the dynamic access device 200 includes the memory apparatus to provision both payment and access support. In the alternative, the dynamic access device 200 may provide separate facilities for conducting access and payment transactions. For example, as shown in FIG. 2C, the dynamic access device 200 may include a memory apparatus 204 to provide support and functionality to conduct access transactions and another memory apparatus 206 to provide support and functionality to conduct payment transactions. As such, the data stored by processor chip 204(a) may not be accessed by processor chip 206(a), and vice versa. Further, the antenna 204(b) may support a different communication protocol than antenna 206(b). For example, antenna 204(b) may communicate with access device readers via a proprietary communication protocol defined by the security system installed in a building, for example. At the same time, antenna 206(b) may communicate with payment device readers via a standard contactless protocol, such as ISO 14443.

ii. Components of a Dynamic Access Device

Figure 4:
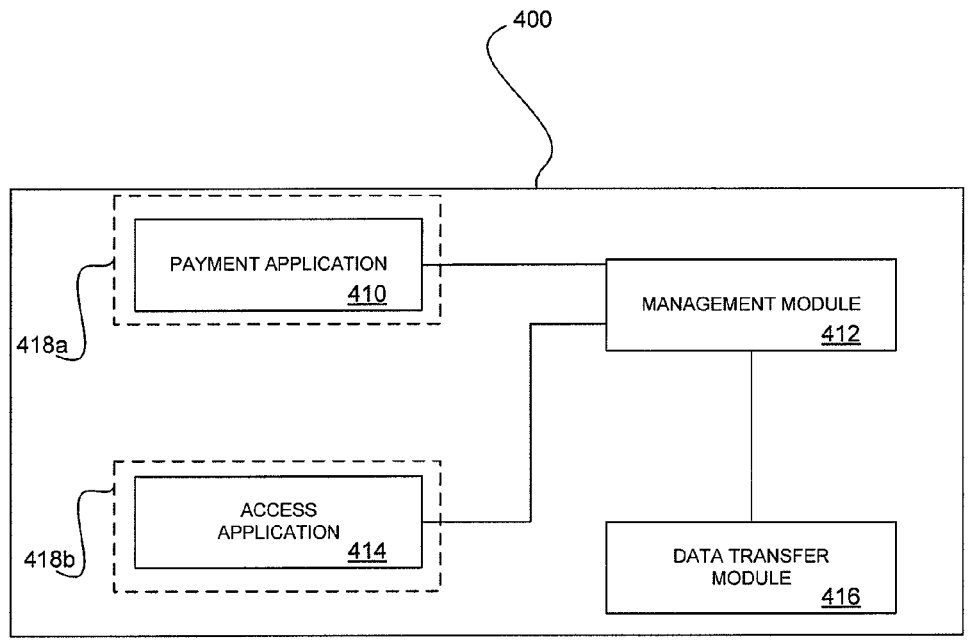
FIG. 4 is a block diagram showing the components of a dynamic device, in accordance with some embodiments of the present invention.

FIG. 4 is a block diagram showing components of a dynamic access device 400. As shown, the dynamic access device 400 includes a payment application 410, a control module 412, an access application 414, and a data transfer module 416.

The payment application 410 includes payment code and/or data. As described above, payment data can be any information that is used in conducting payment transactions. Specific examples of payment data include a primary account number, bank identification number, a user's personal identification number (PIN), encryption keys, or other similar data. "Payment code," as used herein, may refer to instructions that are executable by a processor that facilitate the processing of the payment transaction. For example, in an offline payment transaction, the payment application 410 may verify a user via a submitted password in one example embodiment or calculate an available balance in another example embodiment. In yet other example embodiments, the payment application 410 may include payment code that selects data to transfer to a payment device reader.

The access application 414 includes access code and/or data. As described above, access data can by any information that is used in conducting access transactions. A specific example of access data is a user identification, clearance level, privileges, or any other access related information. "Access code," as used herein, may refer to instructions that are executable by a processor that facilitate the processing of the access transaction. For example, in an offline payment transaction, the payment application 414 may verify the identity of a user via a submitted password in one example embodiment or calculate perform biometric tests in another. In yet other example embodiments, the access application 414 may include access code that selects data to transfer to an access device reader.

In some embodiments, the dynamic access device 400 may optionally provide firewalls 418a and 418b around the payment application 410 and/or the access application 414 to protect sensitive information. A "firewall," as used herein, can refer to any method or component that prevents unauthorized access to some portion of data. In particular, the firewall 418a around the payment application 410 may prevent unauthorized access to a person's private payment data, such as account number or security password. Firewalls 418a and 418b may be implemented in software, hardware, or some combination thereof. Specific examples of firewalls may include address based protection schemes (e.g., as may be provided via virtual memory spaces and/or segmentation), virtual machines, or any other protection mechanisms provided by hardware, firmware, kernel, operating system, or other applications In an example embodiment, to prevent applications 418a and 418b from accessing data associated with the other, applications 418a and 418b can be stored in separate memory housed on the dynamic access device 400. Accordingly, each application may have direct memory access to local memory only. To access data stored on separate memory, the application may interact with the management module 412 to access memory outside of the memory area reserved for that application.

The management module 412 includes common services and code used by the applications 418a and 418b and by other devices, such as the configuration device 115, access device reader 117, and payment device reader 113. In an example embodiment, the management module 412 includes access and priority rules, communication rules, and interface usage rules for applications 418a-418b. When the dynamic access device 400 is communicating to a receiving device (e.g. a configuration device or an access or payment device reader), the management module 412 can identify which applications are permitted to be accessed and in what priority for such access. For example, the dynamic access device 116 may be configured to support one application that provisions payment capabilities associated with funds from a bank account and another application that provides loyalty information for a particular merchant that, for example, rewards a consumer a meal every twentieth purchase. Thus, according to the loyalty application, the management module 412 may cause the dynamic access device 412 to communicate with the payment receiving device by first accessing the loyalty application to determine if the individual is eligible for a free meal and if not then engaging the account application to pay the fare for the ride.

In another way, the management module 412 may restrict access to payment application 410 for certain payment device readers. For example, the management module 412 may receive identification information from the payment device reader 113 to determine whether the payment device reader 113 is associated with a trusted entity, such as the employer. If yes, then the management module 412 may permit communication involving the payment application 410 and the payment device reader 113.

To communication across firewalls, the management module 412 can act as a gatekeeper, using the communication rules to determine if and how one application is allowed to communicate with another application. However, other implementations include firewalls only between some of the applications, allowing the other applications to directly communicate without requiring the facilities of the management module 412.

Data transfer module 412 sends, receives, and processes commands from sources external to the dynamic access device, such as, for example an access device reader, a payment device reader, or a configuration device. For a contactless cards, data transfer module 412 may receive, and process commands according to one or more wireless data transfer mechanisms, e.g., RF, Bluetooth™, Infra-Red, Optical, etc. To do so, the data transfer module 412 may process data exchanged by a device interface. An antenna or optical emitters transmitters/receivers are examples of device interfaces. Additionally, data transfer module 312 may contain logic in software and/or hardware to transmit such data according to specific communication protocols, such as ISO standard 14443.

b. Payment Device i. Structural Elements of the Payment Device

Figure 3:
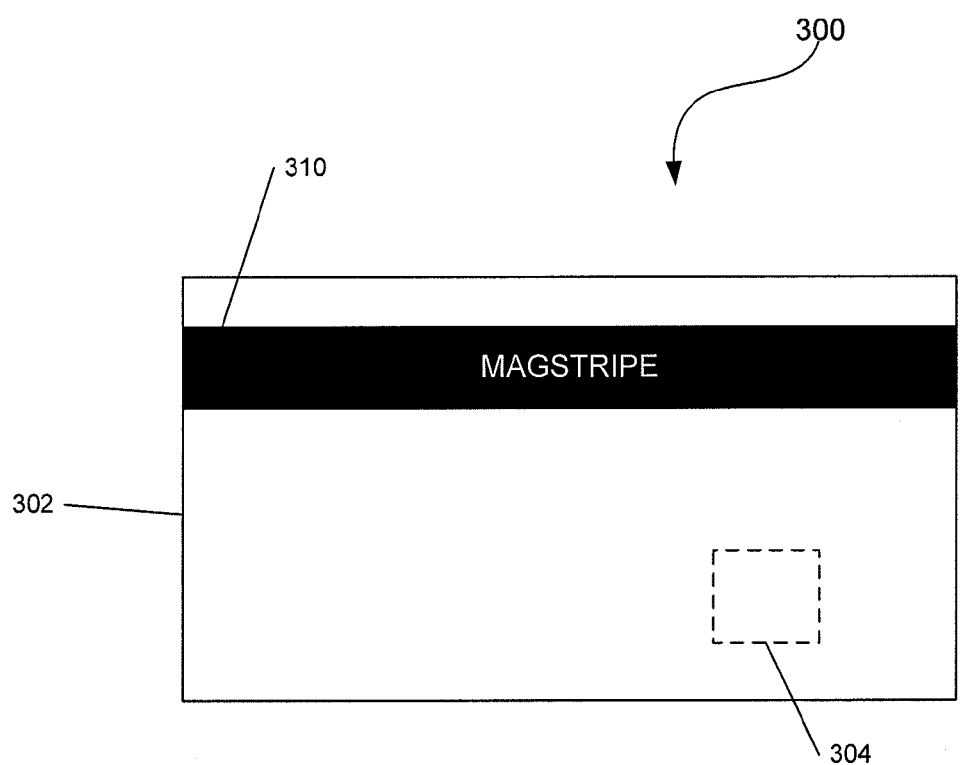
FIG. 3 is a diagram illustrating the primary elements of a payment device, in accordance with some embodiments of the present invention.

FIG. 3 illustrates an example embodiment of a payment device 300. In the present discussion, the payment device 300 is in the form of a card. However, as is described with reference to FIG. 2, payment devices could take other forms, such as cellular and mobile phones, personal digital assistants (PDAs), pagers, smart media, transponders, tokens, fobs, and the like. The payment device 300, similar to the dynamic access device 200, includes a substrate 302 that may contain a memory apparatus 304. In some embodiments, the memory apparatus 304 includes an antenna to facilitate contactless communication (e.g., according to ISO 14443). In other embodiments, the payment device 300 may alternatively or additionally communicate to a receiving device (e.g., the configuration device or payment device reader) through direct contact. In one such implementation, this involves the receiving device having the capability to communicate electronically with the processor chip 304 via a contact plate (not shown) on the front face of the payment device. Alternatively, the receiving device may communicate by physical contact with a magnetic stripe assembly 310 bearing magnetically encoded data. The magnetic stripe assembly 310 may comprise, in one implementation, a reprogrammable magnetic stripe that accepts data and/or commands from chip 304 or an external source and formats and renders that data into a form on a magnetic stripe that is readable by conventional magnetic stripe-reading Point-Of-Service ("POS") terminals. In any case, the payment device stores payment data. For example, the payment device may store information such as bank account information, bank identification number (BIN), expiration data, card verification value (CVV), credit or debit card number information, account balance information, consumer information, or any other similar information. In some embodiments, the payment data is stored in the magnetic stripe assembly 310, such as track 2 and/or three. In other embodiments, the payment data is stored in memory coupled to or included in the memory apparatus 304.

ii. Components of the Payment Device

Figure 5:
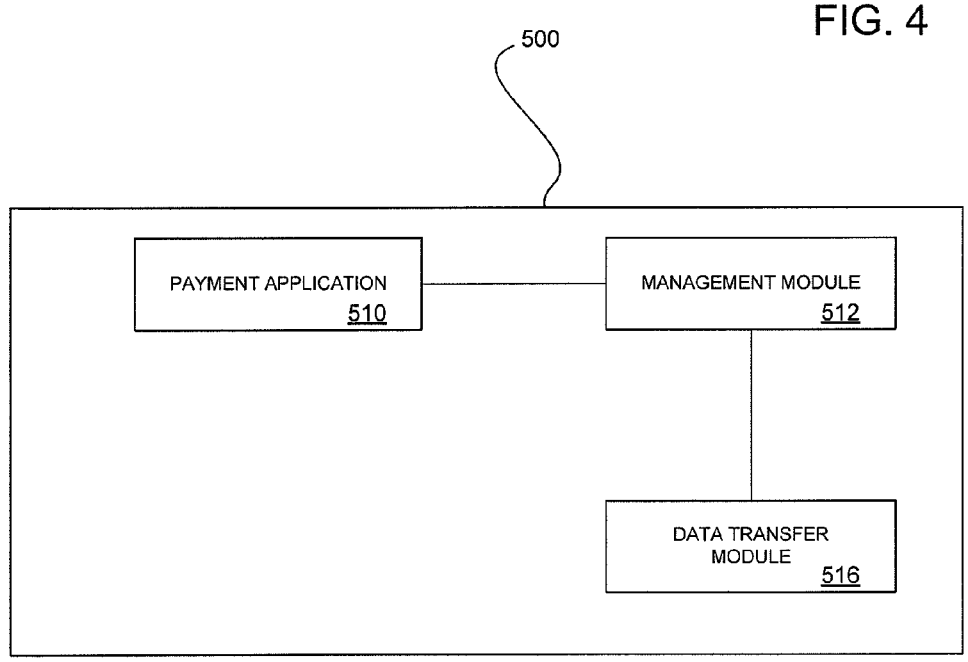
FIG. 5 is a block diagram showing the components of a payment device, in accordance with some embodiments of the present invention.

FIG. 5 is a block diagram showing components of a payment device 500. As shown, the payment device 500 includes a payment application 510, a security module 512, and a data transfer module 516.

The payment application 510 includes payment code and/or payment data. In some example embodiments, the payment application may be embedded or otherwise stored in the memory apparatus 204. For example, payment application can be stored in a magnetic stripe element. In other embodiments, the payment application 510 is embedded or otherwise stored in a memory medium connected to a processor chip. As described above, payment data can be any information that is used in conducting payment transactions. Specific examples of payment data include a primary account number, bank identification number, a user's personal identification number (PIN), encryption keys, or other similar data. "Payment code," as used herein, may refer to instructions that are executable by a processor that facilitates the processing of the payment transaction. For example, in an offline payment transaction, the payment application 510 may verify a user via a submitted password in one example embodiment or calculate an available balance in another example embodiment. In yet other example embodiments, the payment application 510 may include payment code that selects data to transfer to a payment device reader.

Although FIG. 5 shows one payment application, it should be noted that other embodiments may include additional payment applications. Other payment applications may include, for example, rewards programs, offer programs, and the like. Further, applications may include sub-applications.

The management module 512 includes common services and code used by the payment application 510 and by other devices, such as the configuration device 116 and payment device reader 114. In an example embodiment, the management module 512 includes access and priority rules, communication rules, and interface usage rules for application 512. When the payment device 500 is communicating to a receiving device (e.g. a configuration device or payment device reader), the management module 512 can identify which applications are permitted to be accessed and in what priority for such access. For example, the dynamic access device may be configured to support one application that provides access to an individual's bank account and another application that provides loyalty information for a particular merchant that, for example, rewards a consumer a meal every twentieth purchase. Thus, according to the loyalty application, the management module 512 may cause the dynamic access device 512 to communicate with the payment receiving device by first accessing the loyalty application to determine if the individual is eligible for a free meal and if not then engaging the account application to pay the fare for the ride.

In another way, the management module 512 may restrict access to payment application 510 for certain configuration devices. For example, the management module 512 may receive identification information from the configuration device to determine whether the configuration device is associated with a trusted entity, such as the employer. If yes, then the management module 512 may permit access to the payment application 510 for transfer to a dynamic access device.

Data transfer module 512 sends, receives, and processes commands from sources external to the dynamic access device, such as, for example an access device reader or a payment device reader. For a contactless card, data transfer module 512 may receives, and processes commands according to one or more wireless data transfer mechanisms, e.g., RF, Bluetooth™, Infra-Red, Optical, etc. To do so, the data transfer module 512 may process data exchanged by a device interface. An antenna or optical emitters transmitters/receivers are examples of device interfaces. Additionally, data transfer module 512 may contain logic in software and/or hardware to transmit such data according to specific communication protocols, such as ISO standard 14443.

c. Configuration Device i. Structural Elements of the Configuration Device

Figure 6:
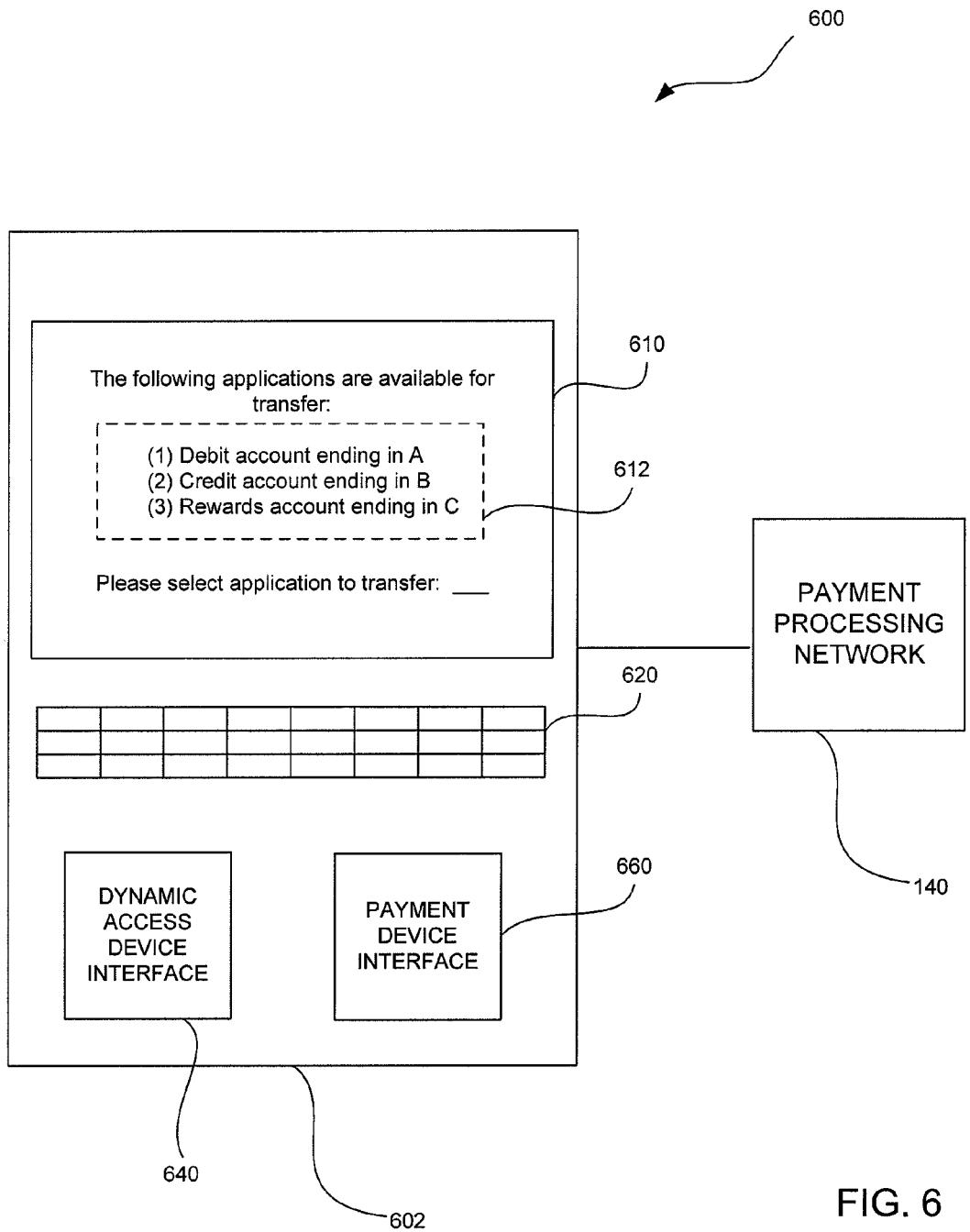
FIG. 6 is a diagram illustrating the primary elements of a configuration device, in accordance with some embodiments of the present invention.

FIG. 6 is a diagram showing a configuration device 600 that manages the transfer of payment data from a payment device to a dynamic access device, according to an example embodiment. The configuration device includes housing structure 602 that includes a display element 610, a data input 620, a dynamic access device interface 640, and a payment device interface 660.

The display element 610 may be may be embodied as a CRT display, an LCD display, a plasma display, a direct-projection or rear-projection DLP, a microdisplay, or the like. In various embodiments, display 610 may be used to display user interfaces and rendered images. For example, FIG. 6 shows that the display element 610 shows a message indicating the applications of a payment device that may be transferred to the dynamic access device.

The data input 620 is typically embodied as a keyboard, computer mouse, a trackball, a track pad, a joystick, wireless remote, drawing tablet, voice command system, and the like. Data input 620 typically allows a user to select objects, icons, text and the like that appear on the display element 610 via a command such as a click of a button or the like.

The dynamic access device interface 640 and the payment device interface 660 are interfaces capable of communication with a dynamic access device and payment device, respectively. Such interfaces may include magnetic stripe, RFID transceiver or smart card reader may be provided in various embodiments.

As FIG. 6 shows, the configuration device 600 may be communicatively coupled to a payment processing network 140. As described below, the payment processing network 140 may be involved in the operations of configuring a dynamic access device with the payment capabilities of an issued payment device.

ii. Components of the Configuration Device

Figure 7:
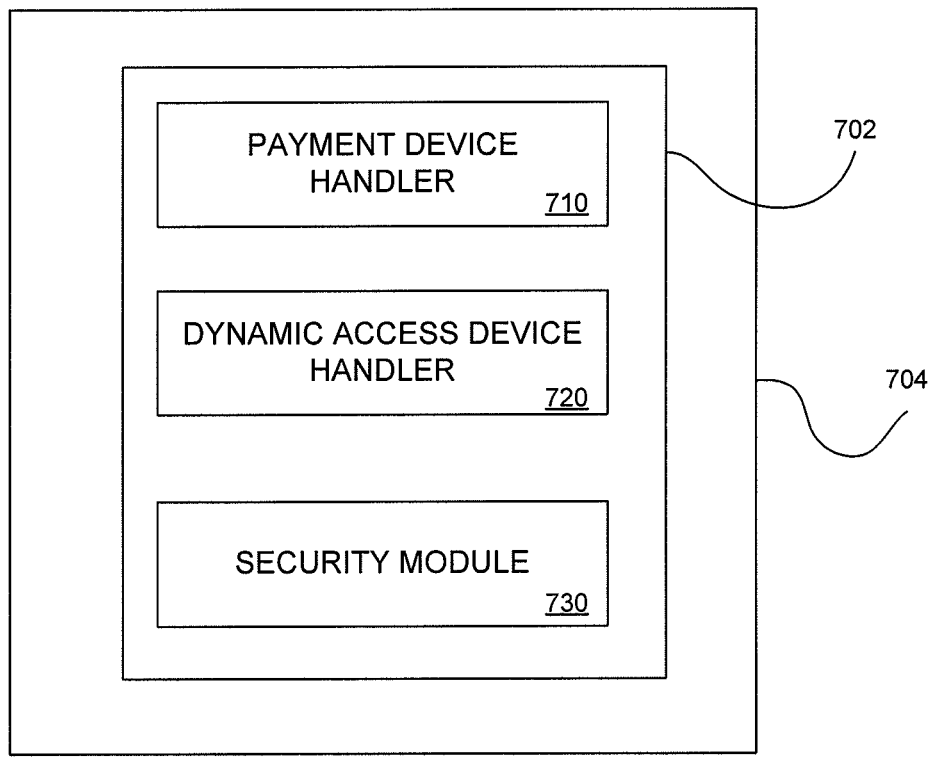
FIG. 7 is a block diagram showing the components of a configuration device, in accordance with some embodiments of the present invention.

FIG. 7 is a component diagram showing various components of a payment data transfer engine 702, according to an example embodiment. The payment data transfer engine 702 may run on a computer 704 of the configuration device 600. The computer 704 may be embodied by one or more computational apparatuses, which can process the methods and processes described herein. Typically, the computer 704 is a computer or cluster of computers that behave as a single computer. For example, the computer 704 can be a mainframe computer, a personal computer, a microprocessor, or some combination thereof. In another example, the computer 704 may include one or more database servers and one or more Web servers. The computer 704 may service the requests of one or more client computers.

As shown, the payment data transfer engine 702 includes a payment device handler 710, a dynamic access device handler 720, and a security module 730.

The payment device handler module 710 performs operations for communicating with a payment device to enable payment capabilities in a dynamic access device. Such operations may include receiving payment data stored on the payment device and verifying various aspects of the transfer. Authenticating the payment device, the holder of the payment device, and authorizing the request to transfer payment data to the dynamic access device are examples of operations performed by the payment device handler module 710.

The access device handler module 720 performs operations for configuring the dynamic access device to support payment capabilities associated with the payment device. Such operations may include transferring payment data associated with the payment device to the dynamic access device. In some embodiments, the access device handler module 720 may also perform authenticating and authorizations operations with regards to the dynamic access device similar to the such operations performed by the payment device handler module 710.

The security module 720 performs operations for preventing the fraudulent transfers of payment data to dynamic access devices, as may be carried out by fraudsters. Such operations may include limiting the number of transfers, disabling devices, identifying companion devices, etc. These operations are described in greater detail below.

III. Method a. Configuring the Dynamic Access Device

Figure 8:
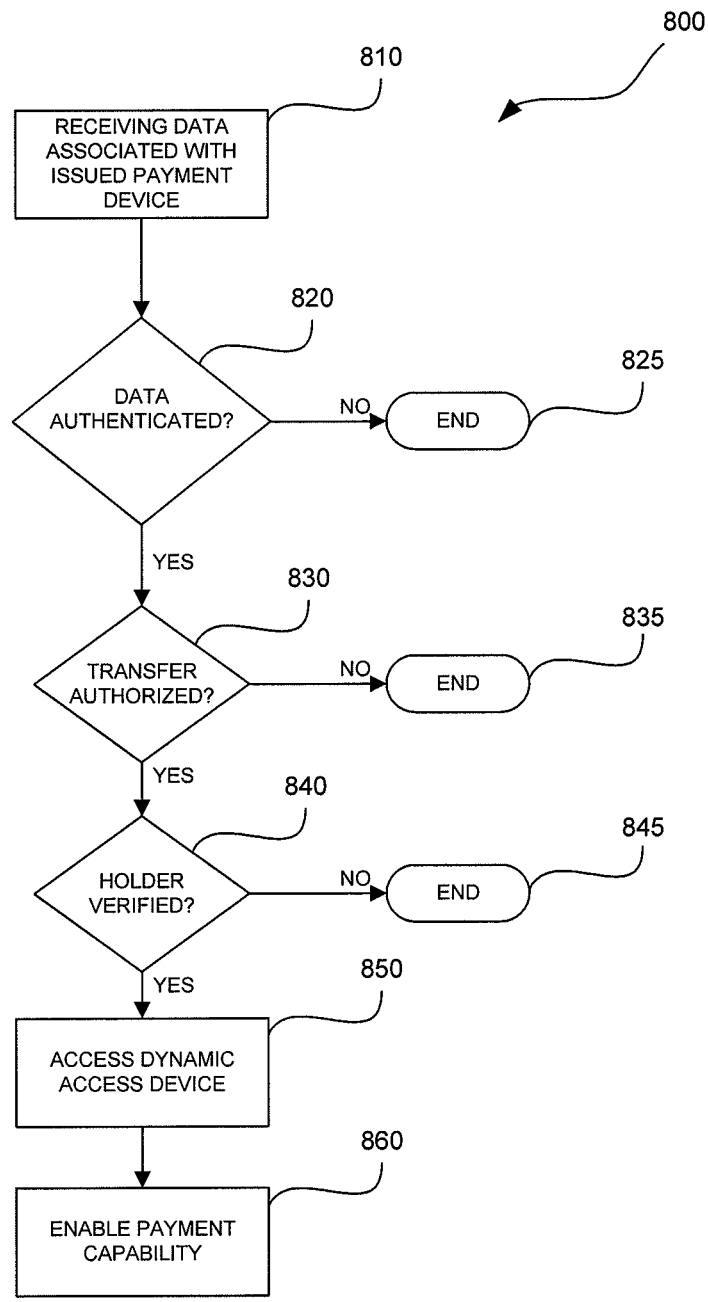
FIG. 8 a flow diagram showing a method for configuring a dynamic device, in accordance with some embodiments of the present invention.

FIG. 8 is a flow diagram that illustrates a method 800 of configuring a dynamic access device with payment data associated with an issued payment device, according to an example embodiment. The various operations of the method 800 can be performed, for example, by the memory apparatus embedded in the dynamic access device. Various operations of the method 800 can also be performed by the payment processing network 140 of FIG. 1, as described above. The payment processing network 140 performing a method, such as the method 800 or some other method, may use one or more computers or network of computers to perform some or all of the acts within the method. Still further, various operations of the method 800 can be performed by a memory apparatus embedded on the payment device.

The method 800 involves, at operation 810, receiving payment data associated with an issued payment device, such as a credit card. The payment data may be received by the payment device handler 710 (see FIG. 7). The payment device handler 710 may receive payment data from the payment device in a number of ways. In one example embodiment, wherein the payment device stores payment data via a magnetic stripe, the consumer may swipe their payment device through a magnetic stripe reader connected to the configuration device.

In another embodiment, wherein the payment data is stored within a processor chip embedded in the payment device, the payment device handler 710 may receive the payment data via contact or contactless interface. According to such contact or contactless interface, the configuration device and the payment device may communicate a list of applications supported by each device. For example, the payment device may transmit, to the configuration device, a list of the application identifiers associated with applications installed on the payment device. With the list of installed applications, the configuration device can generate a candidate list of applications that are supported by both the configuration device and the payment device. An example of an application is a payment application. One way to determine the applications installed on the payment device is for the payment device handler 710 to obtain a directory listing of all card applications from the control module of the payment device. If this is not supported or fails to find a match, the configuration device can iterate through its list asking the payment device whether it supports each individual application by application identifier. If there are multiple applications in the completed candidate list, or the application requires it, then the configuration device can request the consumer, employer, or any other responsible party to select an application to transfer. FIG. 6 shows an example message to a user that requests selection of an application to transfer. In some example embodiments, the configuration device may automatically select the application to transfer, for example if there is only one payment application installed on the payment device.

Once the application is selected, the configuration device can select the application on the payment device, so that the payment device can supply payment data associated with the selected applications. In some embodiments, the payment data is stored in records and the payment device can supply an application file locator to identify the records stored in the payment device.

Once the configuration device receives the payment data, the payment device handler 710 can authenticate the payment data received from the issued payment device. This is shown in operation 820. Authenticating the payment data includes determining whether the payment device is validly associated with the payment data. This protects an account holder from a fraudster that attempts to copy or skim payment data to other devices. In some embodiments, such as a magnetic stripe payment card, the configuration device may receive a verification value (e.g., the CVV value contained on the back of the payment card) and send the verification value to the payment processing network for verification. In other embodiments, such as a smart payment card, such authentication may include data authentication approaches supported by payment devices, such as SDA (static data authentication), DDA (dynamic data authentication), CDA (combined DDA and application cryptography), or any other method for authentication the payment device.

If authentication of the payment data fails, the method performs operation 825, which terminates performance of the method 800. According to some example embodiments of the operation 825, an indication that the data failed authentication is presented to a user. As a specific example, a display (e.g., a LCD screen) may display a screen saying that there was an error involved with authenticating the data on the payment card.

Operation 830 involves determining whether the request to enable the dynamic access device with payment capabilities associated with the issued payment device is an authorized operation. Authorization of whether the transfer operation may be verified by offline or online methods. For example, the payment device handler 710 may query the payment processing network 140 to determine whether the consumer is authorized to configure the dynamic access device. In turn, the payment processing network 140 can send the request to the issuer for authorization. The payment processing network 140 (or the issuer) can, for example, limit the number of dynamic access devices the account holder can transfer. In other embodiments, only authorized entities can request such an operation. Entities such as an employer or the account holder can provide information of their identity by providing a personal identification number to the payment processing network or other identifying information. If the configuration of the dynamic access device is an offline operation (e.g., performed without communication with the payment processing network), a memory apparatus embedded on the payment device or the configuration device may perform authorization of the operation.

The advantage of such authorization is that it prevents fraudulent spread of the payment data associated with the payment device. Such is the case where the payment processing network limits the number of transfers or requires an authorized entity to approve the transaction. These and other security measures are explained below.

If the method 800 determines that the request to configure the dynamic access device is an unauthorized operation, the method performs operation 835. Operation 835 involves terminating performance of the method 800. According to some example embodiments of the operation 835, an indication is provided to a user that the request initiated in operation 830 failed because the request is unauthorized. As a specific example, a display (e.g., a LCD screen) may display a screen saying that there was an error involved with authenticating the data on the payment device.

Operation 840 involves authenticating the holder of the payment device. Holder verification determines whether the person using the device is the valid owner of the device. The payment device can provide a list of verification methods that it supports, and the conditions under which they should be applied. The configuration device can navigate through this list and attempt the first method it finds for which the condition is met. If a method fails, the terminal must check whether additional methods are allowed. For example, the payment device may provide a list that might include: online PIN if the payment application to be downloaded will not be limited, offline PIN if the payment application to be downloaded will be limited, signature is always required, or some combination thereof. Limits can refer to limits to the use of a payment application that is downloaded or to whether the configuration device can perform the download. Such limits are described below. Accordingly, a payment device may require the consumer to provide an online PIN if the user wishes to download a payment application to the dynamic access device without limits to the number of uses, or time period in which the payment application is valid, or any other limitation. On the other hand, an offline PIN may be sufficient if the consumer is requesting a one time use transfer. Other embodiments may include alternative lists.

To provide two- or three-factor authentication, some embodiments may combine the above account holder authentication with biometric information. "Biometric information," as used herein, can refer to any information used in a to uniquely recognizing humans based upon one or more intrinsic physical or behavioral traits. Such information can include but is not limited to fingerprints, face recognition, DNA, palm print, hand geometry, dental geometry, iris and/or retina recognition, voice, typing rhythm, or any other physical or behavioral trait. Biometric information can be authenticated by modules of the payment device or the configuration device.

If the method 800 determines that the holder of the payment device is not verified as a valid holder of the device, the method performs operation 845. Operation 845 involves terminating performance of the method 800. According to some example embodiments of the operation 835, an indication is provided to a user that the terminal was unable to verify the consumer. As a specific example, a display (e.g., a LCD screen) of the configuration device may display a screen saying that there was an error involved with authenticating the user.

Operation 850 involves accessing the dynamic access device. For example, the dynamic access device handler 720 may access the dynamic access device via contact or contactless technologies. For simplicity of discussion, the dynamic access device handler 720 may perform a number of determinations described by operations 830 and 840. However, rather than communication with the payment device, the dynamic access device is used. In particular, dynamic access device handler 720 communicates with the dynamic access device to verify that the transfer of payment data is authorized and the holder of the dynamic access device is valid. For example, the dynamic access device handler 720 may receive a candidate application list by querying for a list of applications the dynamic access device supports, or by querying whether the dynamic application device supports each individual application supported by the configuration module. In an example embodiment, the management module 412 may be presented as an application capable of performing the operations necessary to download a payment application associated with the payment data of an issued payment device onto a dynamic access device.

Operation 860 involves enabling payment capability on the dynamic access device. Although enabling payment capability on the dynamic access device is described in greater detail below (with respect to FIG. 9), operation 860 generally includes transferring the payment data received from the payment device at operation 810 to the dynamic access device. In one way, the dynamic access device handler module 720 downloads a payment application that includes the payment data of the payment device to the dynamic access device. As part of this download, the application downloader may alter the payment data. For example, the application downloader may modify the payment data to indicate that it supports contactless payment. As another example, the application downloader may transfer security keys used in device and holder authorization.

Once the dynamic access device is configured to include a payment application with payment data associated with an existing payment device, the consumer may then use the dynamic access device to make purchases similar to the method of making a purchase using a payment device that supports contactless payments. For example, the consumer may purchase items from vending machines or the cafeteria provided by the employer by waiving the card near a contactless payment device reader. Additionally, the consumer may use the dynamic access device to conduct access transactions as were previously performed. For example, the consumer, using the contactless feature of the dynamic access device, waive the device near the access device reader to establish a connection between the dynamic access device and the access device reader. Through this connection, the dynamic access device may transmit identification information to the security system that manages access to a resource.

b. Enabling Payment Functionality

Figure 9:
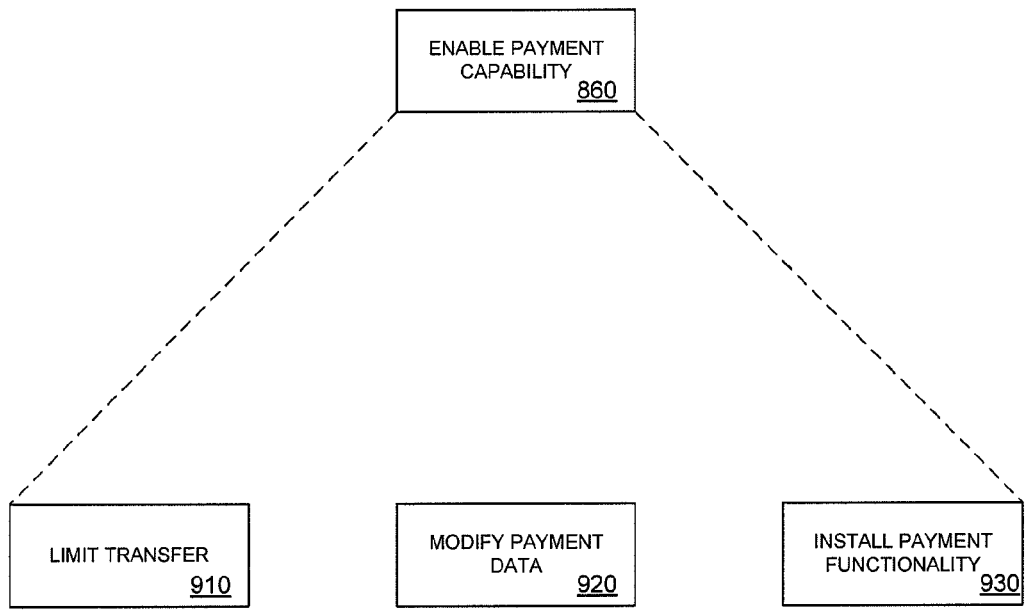
FIG. 9 a block diagram showing a optional operations for the enable payment capability operation of the configuring a dynamic device method, in accordance with some embodiments of the present invention.

FIG. 9 is a diagram that shows that the enable payment capability operation 860 of FIG. 8 may include various sub-operations, such as limit transfer 910, update payment data 920, and store payment data 930.

Limit Transfer 910,

The configuration device may optionally limit the transfer of payment data of the issued payment device to dynamic configuration devices in certain situations. For example, the configuration device may cause an update of a counter used to track the number of times the payment data has been transferred. The configuration device can compare the counter to some determinable limit to effectively limit the number of configurable access devices that can use the consumer device. Such a counter may be maintained by either the payment processing network, issuer, or, if supported, by the payment device or the dynamic access device. In example embodiments, once a dynamic access device is configured to support a payment capability associated with an existing payment device, the employee may later use the configuration device to disable the payment capability. In such cases, the configuration device may adjust the counter to reflect that there is one less device with the payment capability.

In another example embodiment, during the downloading of the payment application to the dynamic access device, the configuration device may set some flag or signal associated with the payment application to indicate that the dynamic access device is a companion device to the payment device. A "companion device" as used herein may refer to a device with payment capabilities that are associated a payment device issued by an issuer. Once identified as a companion device, the system may then prohibit future transfer of payment data from companion device to other dynamic access devices. This limits the number of transfers by requiring that the original issued payment data be used in such configurations. Thus, at some later time, the configuration device, or the payment processing network or issuer, can decline a request to transfer payment data from the configured dynamic access device to another dynamic access device. In such embodiments, the configuration device will only install payment applications from the payment device issued by the issuer.

In yet another example embodiment, the system 100 may limit the number of transfers of payment data by disabling the device once the method for configuring the dynamic access device is completed. As described above, "disabling" a device, as used herein, may refer to any indication that prohibits the device from being used as a payment device. In such embodiments, configuration device may set a flag or signal on payment device to indicate that the device is disabled and can not be used as a payment device. In other embodiments, the indication that the device is disabled may be maintained by the payment processing network or issuer. Payment transactions or future configurations using the disabled payment device may be prohibited by embodiments of the invention.

According to alternate embodiments, other limits may be applied to the transfer of payment data to the dynamic access device, such as a velocity limit to deny requests above a certain frequency, assigning limited use account numbers to the dynamic access device, providing a one time encryption, and any other action taken to limit the unfettered spread of the payment data.

Update Payment Data 920,

In some embodiments, the configuration device may update some portion of the payment data. For example, the payment data may be altered to indicate that it is a contactless application. Such may be the case where the payment device stores the payment data in the magnetic stripe (see FIG. 3) and the dynamic access device communicates with payment device readers through contactless methods. To indicate that the payment application is a contactless application, the configuration device may read in the payment data from the magnetic stripe and change fields like service codes to indicate that the payment data is associated with a contactless payment device.

Store Payment Data 930.

Once the configuration device determines that the payment data may be transferred to the dynamic access device, the dynamic access device handler may send the payment data to the management module 412 of the dynamic access device. In some embodiments, the management module 412 or the dynamic access device handler 720 may format the payment data into a payment application. At the completion of the transfer, the configuration device may erase or otherwise remove the payment data from memory maintained by the configuration device. The management module 412 may protect the payment data with a firewall according to the techniques described above. In other example embodiments, the configuration device or the dynamic access device (e.g., the management module 412) may also store cryptographic keys and codes to secure the payment application. In such cases, some embodiments may reconfigure authorization data such as SDA, DDA, CDA, CVV, or the like.

IV. Computer Systems

Figure 10:
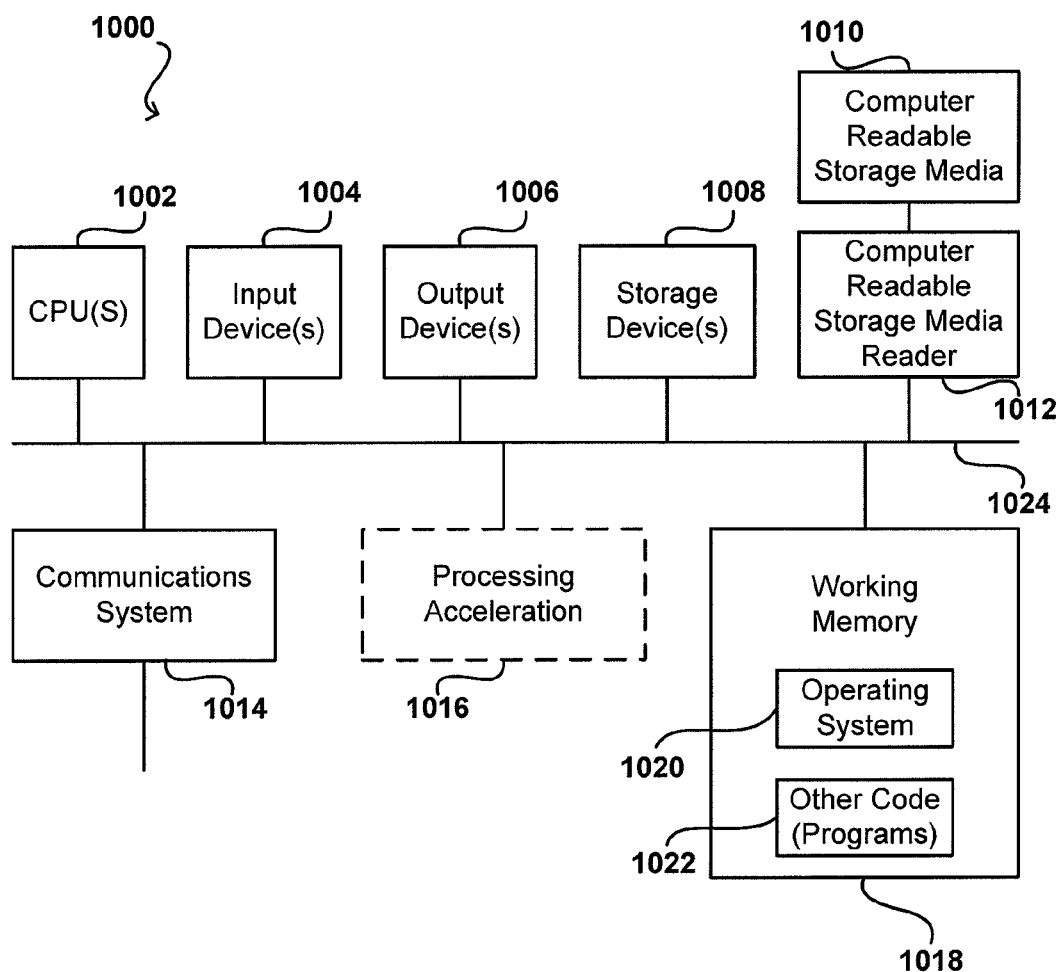
FIG. 10 is a block diagram illustrating the primary functional components of a computer or computing system that may be used to implement an element or component used in some embodiments of the present invention.

Any of the elements in figures described herein can use any suitable number of subsystems to facilitate the functions described herein. System 1000 in FIG. 10 is representative of a computer system capable of embodying various aspects of the present invention. The computer system can be present in any of the elements in figures described herein, including configuration device 115, for example. Similarly, the various participants, entities and elements in FIG. 1 may operate one or more memory apparatuses to facilitate the functions described herein. It will be readily apparent to one of ordinary skill in the art that many other hardware and software configurations are suitable for use with the present invention.

For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 1000 typically includes a display 1010, computer 1020, a keyboard 1030, a user input device 1040, computer interfaces 1050, and the like. In various embodiments, display (monitor) 1010 may be embodied as a CRT display, an LCD display, a plasma display, a direct-projection or rear-projection DLP, a microdisplay, or the like. In various embodiments, display 1010 may be used to display user interfaces and rendered images.

In various embodiments, user input device 1040 is typically embodied as a computer mouse, a trackball, a track pad, a joystick, wireless remote, drawing tablet, voice command system, and the like. User input device 1040 typically allows a user to select objects, icons, text and the like that appear on the display 1010 via a command such as a click of a button or the like. An additional specialized user input device 1045, such a magnetic stripe, RFID transceiver or smart card reader may also be provided in various embodiments. In other embodiments, user input device 1045 include additional computer system displays (e.g. multiple monitors). Further user input device 1045 may be implemented as one or more graphical user interfaces on such a display.

Embodiments of computer interfaces 1050 typically include an Ethernet card, a modem (telephone, satellite, cable, ISDN), (asynchronous) digital subscriber line (DSL) unit, FireWire interface, USB interface, and the like. For example, computer interfaces 1050 may be coupled to a computer network, to a FireWire bus, or the like. In other embodiments, computer interfaces 1050 may be physically integrated on the motherboard of computer 1020, may be a software program, such as soft DSL, or the like.

RAM 1070 and disk drive 1080 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 1000 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 1020 typically includes familiar computer components such as a processor 1060, and memory storage devices, such as a random access memory (RAM) 1070, disk drives 1080, and system bus 1090 interconnecting the above components.

In some embodiments, computer 1020 includes one or more Xeon microprocessors from Intel. Further, in the present embodiment, computer 1020 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such non-transitory computer readable medium may reside on or within a single computational apparatus, and may be present on or within different computational apparatuses within a system or network.

The above descriptions are illustrative and are not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. For example, any of the above described analytics may be combined with any other suitable analytics in any suitable manner in methods or systems according to embodiments of the invention. Thus, although specific features are separately described in this application, they may be combined in certain embodiments of the invention.

A recitation of "a", "an" or "the" is intended to mean "one or more" unless specifically indicated to the contrary.

What is claimed is:

1. A method comprising:
receiving, on a payment device interface of a configuration device, payment data from an issued payment device communicatively coupled to the configuration device;
transmitting payment data to a dynamic device communicatively coupled to a dynamic device interface of the configuration device;
obtaining, by the configuration device, a list of applications installed on the issued payment device from the issued payment device;
providing the list to a user;
receiving a selection corresponding to at least one of the applications;
transferring the selected application to the dynamic device; and
enabling, by the configuration device, payment capability on the dynamic device, wherein the payment capability is based on the payment data received from the issued payment device, and wherein the payment capability based on the payment data received from the issued payment device and enabled by the configuration device allows multiple payment transactions to be conducted with the dynamic device in the absence of both the payment device and the configuration device.

2. The method of claim 1, further comprising modifying the payment data to indicate support for contactless payment transactions.

3. The method of claim 1, wherein the issued payment device includes a magnetic stripe, and the magnetic stripe stores the payment data on track two or track three of the magnetic stripe of the issued payment device.

4. The method of claim 1, further including:
responsive to the enabling, incrementing a counter associated with a number of times the payment data is used to enable payment capability;
receiving a request to enable payment capability on another dynamic device;
comparing the counter with a threshold value; and
denying the request to enable payment capability on the another dynamic device based on the comparison.

5. The method of claim 1, wherein the dynamic device includes a first memory apparatus to receive a first frequency and a second memory apparatus to receive a second frequency, wherein the first memory apparatus performs access capability and the second memory apparatus performs the payment capability.

6. The method of claim 1, further comprising setting the dynamic device as a companion device.

7. The method of claim 1, wherein the enabling operation includes:
transforming the payment data into a payment application; and
transferring the payment application to a memory apparatus of the dynamic device.

8. The method of claim 7, wherein the payment application is associated with an employer.

9. The method of claim 1, further comprising disabling the issued payment device.

10. A configuration device comprising:
a payment device interface for communicating with an issued payment device;
a dynamic device interface for communicating with a dynamic device; and
a processor and a computer-readable storage medium coupled to the processor, the computer readable storage medium comprising code executable by the processor for implementing a method comprising:
receiving payment data from the issued payment device communicatively coupled to the payment device interface;

transmitting payment data to the dynamic device communicatively coupled to the dynamic device interface;

obtaining a list of one or more application identifiers of applications installed on the issued payment device from the issued payment device;

generating a candidate list of one or more applications supported by both the issued payment device and the configuration device for transfer to the dynamic device; and enabling payment capability on the dynamic device, wherein the payment capability is based on the payment data received from the issued payment device, and wherein the payment capability based on the payment data received from the issued payment device and enabled by the configuration device allows multiple payment transactions to be conducted with the dynamic device in the absence of both the payment device and the configuration device.

11. The configuration device of claim 10 wherein the method further comprising modifying the payment data to indicate support for contactless payment transactions.

12. The configuration device of claim 11, wherein the payment data is received from a magnetic stripe of the issued payment device, wherein the magnetic stripe stores the payment data on track two or track three.

13. The configuration device of claim 10, wherein the method further comprising:

responsive to the enabling, incrementing a counter associated with a number of times the payment data is used to enable payment capability;

receiving a request to enable payment capability on another dynamic device;

comparing the counter with a threshold value; and denying the request to enable payment capability on the another dynamic device based on the comparison.

14. The configuration device of claim 10, wherein the dynamic device includes a memory apparatus to receive a first frequency and a second memory apparatus to receive a second frequency, wherein the first memory apparatus performs access capability and the second memory apparatus performs the payment capability.

15. The configuration device of claim 10, wherein the method further comprises setting the dynamic device as a companion device.

16. The configuration device of claim 10, wherein the enabling operation of the method further includes:

transforming the payment data into a payment application; and transferring the payment application to the memory apparatus of the dynamic device.

17. The configuration device of claim 16, wherein the payment application is associated with an employer.

18. The configuration device of claim 16, wherein the method further comprises disabling the issued payment device.

19. A computer readable medium storing commands for causing a processor to implement the method of claim 1.

20. The method of claim 1, further comprising:

obtaining a list of verification methods supported by the issued payment device; and selecting a verification method from the list of verification methods to verify a user of the issued payment device before enabling the payment capability on the dynamic device.

21. The method of claim 20, wherein the selection of the verification method is based on whether there is a limit on the number of times that a payment application of the issued payment device is allowed to be downloaded to the dynamic device.

* * * * *